United States Patent [19]

Cantwell et al.

[11] Patent Number: 5,410,750
[45] Date of Patent: Apr. 25, 1995

[54] INTERFERENCE SUPPRESSOR FOR A RADIO RECEIVER

[75] Inventors: Robert H. Cantwell, Sudbury; James B. Matthews, Wayland, both of Mass.

[73] Assignee: Raytheon Company, Lexington, Mass.

[21] Appl. No.: 840,252

[22] Filed: Feb. 24, 1992

[51] Int. Cl.[6] .............................................. H04B 1/10
[52] U.S. Cl. .................................. 455/306; 455/307; 455/311; 375/200; 375/349
[58] Field of Search ............... 455/295, 296, 303, 304, 455/306, 307, 311, 308; 375/99, 102, 103, 1; 380/34

[56] References Cited

U.S. PATENT DOCUMENTS

| | | | |
|---|---|---|---|
| 4,287,475 | 9/1981 | Eaton et al. | 455/306 X |
| 4,320,523 | 3/1982 | Horikawa et al. | 455/307 X |
| 4,613,978 | 9/1986 | Kurth et al. | 455/308 X |
| 4,673,982 | 6/1987 | Tam et al. | 455/295 X |
| 4,972,430 | 11/1990 | Cantwell. | |

OTHER PUBLICATIONS

"Linear Circuits" Part 2, Frequency–Domain Analysis, Ronald E. Scott, Addison–Wesley Publishing Company, Inc., Reading, Mass., 1960, pp. 516–522.
"GPS Signal Structure and Performance Characteristics," J. J. Spilker, Jr., The Institute of Navigation, Global Positioning Papers, published in Navigation, vol. 2, pp. 29–54.

Primary Examiner—Edward F. Urban
Attorney, Agent, or Firm—Walter F. Dawson

[57] ABSTRACT

The RF input of a radio receiver is converted to IF including received signal, noise and interference and fed to an interference detector and to an interference canceler of an interference suppressor. A fast Fourier transform (FFT) at the front end of the interference detector detects samples of all the interferences in the frequency domain. The frequency domain samples are scaled for gain control and detection of interferences above a predetermined threshold. The interference detector suppresses interferences to the predetermined threshold level. The scaled frequency domain interference samples are phase rotated and fed to an inverse fast Fourier transform to obtain a time domain replica of the interferences which are phase shifted replicas of the detected interferences. Such digital time domain replicas are converted to a continuous analog replica of the interferences, converted back to IF and summed with the original IF which included received signals, noise and interferences in order to cancel the interferences at the output of the interference suppressor.

9 Claims, 13 Drawing Sheets

INTERFERENCE SUPPRESSOR FOR A RADIO RECEIVER

BACKGROUND OF THE INVENTION

The invention relates generally to the field of radar and radio receivers and in particular to an interference suppressor and a Global Positioning System (GPS) navigation system receiver employing such an interference suppressor.

The Global Positioning System (GPS) is a navigation system based on eighteen satellites in orbit. When fully operational the eighteen satellites will be evenly dispersed in three, inclined, 12-hour circular orbits chosen to ensure continuous 24-hour coverage. The GPS provides extremely accurate time and three-dimensional position and velocity information to users anywhere in the world. Normally, four satellites are required for precise location determination in four dimensions (latitude, longitude, altitude and time). The location determinations are based on measurement of the transit time of RF signals from the satellites selected from the total of eighteen. Each satellite transmits a different pair of L-band carrier signals including an L1 signal at 1575.42 MHz and an L2 signal at 1226.6 MHz. The L1 and L2 signals are biphase modulated by two pseudo-random noise (PN) codes comprising a P-code which provides for precision measurement of transit time and a C/A (course/acquisition) code which provides for a course measurement of transit time and provides for easy lock-on to the desired signal suitable for many commercial purposes. Since each satellite uses different PN-code sequences, a signal transmitted by a particular satellite can be selected by generating and matching (correlating) the corresponding PN-code pattern.

Phase code modulation is ideally suited to measuring time of time delay. The time delay is a measure of range while the difference in phase measurements taken at fixed time intervals is a measure of frequency. The phase code modulation is compared (correlated) with the expected phase or replica of the phase code modulation. Typical phase code modulations include not only Binary Phase-Shift Keying (BPSK), but also Binary Frequency-Shift Keying (BFSK).

The P-code is the principal navigation pseudo-random noise (PN) ranging code of the Global Positioning System. The P-code is a repetitive sequence of bits referred to as chips (in spread spectrum parlance). The P-code for each satellite is the product of two PN-codes X1 and X2 where X1 has a period of 1.5 sec or 15,345,000 chips and X2 has a period of 15,345,037 or 37 chips longer. The P-code generator in a GPS receiver reproduces a replica of the P-code that is generated by a P-code generator of a particular GPS satellite and each satellite produces a unique P-code. The C/A code is a relatively short code of 1023 bits or 1 msec duration at a 1.023 Mbps bit rate. This code is selected to provide good multiple access properties for its period.

For both military and commercial applications the ability of the GPS receiver to resist jamming or interference is very important. With the typical spread spectrum signal, the received signal is below the receiver noise level. Examples for the typical spread spectrum pseudo-noise (PN) code rates are:

| PN-CODE $R_c$ | PN-CODE TRACK I/S = 10 LOG $R_c$ | PN-CODE DATA DEMODULATION I/S = LOG($R_c/2R_d$) |
| --- | --- | --- |
| ½ MHz | 57 dB | 37 dB |
| 1 MHz | 60 dB | 40 dB |
| 5 MHz | 67 dB | 47 dB |
| 10 MHz | 70 dB | 50 dB | where: $R_c$=the PN-code chip rate, and the data modulation rate ($R_d$) equals 50 Hz. When data is modulated on the PN-code bit stream, it is also assumed to be a random stream of data bits. The signal-to-interference power ratio is discussed in a paper entitled "GPS Signal Structure and Performance Characteristics," by J. J. Spilker, Jr., reprinted by The Institute of Navigation, Global Positioning Papers, published in Navigation, Vol. 2, pp. 29–54. Spilker shows on page 42 that the signal-to-interference ratio equals $R_c/2R_d$; with 50 Hz data modulation the signal-to-interference power ratio for the P-code is 10 log ($R_c/2R_d$) or 50 dB. Hence, GPS receivers are known to provide 50 dB of interference discrimination; however, in higher interference environments, such as 100 dB interference-to-signal (I/S) ratio, a GPS receiver does not operate properly. Adaptive filters have been employed to put notches in the frequency bandwidth and provide approximately 25 dB interference discrimination thereby providing a total of 75 dB of total interference discrimination. RF amplitude suppression using a null steering antenna is a technique to provide approximately 25 dB additional interference discrimination. Cascading such a null steering antenna, an adaptive filter and a GPS receiver can provide 100 dB of interference discrimination. However, the cost and size constraints of such prior art technologies have made this level of interference discrimination prohibitive for certain applications. There exists a need to employ GPS for guidance and navigation applications having an I/S ratio of equal to or greater than 100 dB, but such applications require a low cost, small size, light weight and low power GPS system. In order to meet these requirements an alternative means to the use of adaptive filters is described herein which also provides 25 dB interference discrimination.

Summary of the Invention

Accordingly, it is therefore an object of this invention to suppress interference signals in a radio receiver.

It is another object of this invention to detect samples of all interference signals in the frequency domain above a predetermined threshold and to obtain a time domain replica of the detected interference signals for canceling such interference signals.

The objects are further accomplished by a radio receiver comprising means for generating an IF signal from a received spread spectrum signal including interference signals, means coupled to the IF signal generating means for suppressing the interference signals coupled to the IF signal, the suppressing means comprising means for estimating the interference signals coupled to the IF signal in a frequency domain and canceling the interference signals in a time domain resulting in an IF output without the coupled interference signals, means coupled to the IF output of the suppressing means for generating in-phase (I) and quadrature-phase (Q) samples of the IF output, and means coupled to the I and Q samples generating means for processing the I and Q samples. The interference suppressing means comprises means for down converting the IF signal including interference signals to baseband sampled signals, means coupled to the down converting means for converting the baseband sampled signals from a time domain to a frequency domain, means coupled to the time domain to frequency domain converting means for excising the interference signals in the frequency domain, means coupled to the excising means for converting the excised interference signals from the frequency domain to the time domain, means coupled to the frequency to time domain converting means for up-converting the interference signals from baseband sampled signals to intermediate frequency, and means coupled to the up-converting means and the receiving means for summing the interference signals from the up-converting means with the spread spectrum IF signal including interference signals from the receiving means to cancel out the interference signals coupled to the IF signal.

The objects are further accomplished by a radio receiver wherein the interference signals excising means comprises a filter controller means coupled to the time domain to frequency domain converting means for generating delays for the frequency domain interference sampled signals to allow for continuous inputs and outputs of the suppressing means, a cell magnitude detector means coupled to the delayed interference sampled signals from the filter controller means for detecting an adjacent and main cell magnitude of the interference sampled signals at a sampling frequency rate, phase selector means coupled to the cell magnitude detector means for determining a phase rotation angle ($\phi_K$) of each frequency domain interference sampled signals, phase rotator means coupled to the phase selector means and the filter controller means for providing the phase rotation angle ($\phi_K$) to each of the frequency domain interference sampled signals, and a frequency domain amplitude selector means coupled to the phase rotator means for denormalizing the phase rotated frequency domain interference sampled signals to generate a frequency domain interference amplitude estimates in accordance with a frequency domain scale factor signal.

The objects are further accomplished by a method of suppressing interference signals comprising the steps of estimating the interference signals, coupled to an IF signal with estimating means, the estimating means comprising means for performing the estimating in a frequency domain, and combining the estimated interference signals with the IF signal which comprises interference signals to cancel the interference signals. The step of estimating the interference signals comprises the steps of down converting the IF signals including interference signals to baseband sampled signals, converting the baseband sampled signals from a time domain to a frequency domain, excising the interference signals in the frequency domain resulting in estimated interference signals, converting the estimated interference signals from the frequency domain to the time domain, and up converting the estimated interference signals from baseband sampled signals to intermediate frequency for canceling the interference signals coupled to the IF signal. The step of excising the interference signals in the frequency domain further comprises the steps of generating delays for the frequency domain interference sampled signals to allow for continuous inputs and outputs of the suppressing means with a filter controller means coupled to the time domain to frequency domain converting means, detecting an adjacent and main cell magnitude of the interference sampled signals at a sampling frequency rate with a cell magnitude detector means coupled to the delayed interference sampled signals from the filter controller means, determining a phase rotation angle ($\phi_K$) of each frequency domain interference sampled signals using a phase selector means coupled to the cell magnitude detector means, providing the phase rotation angle ($\phi_K$) to each of the frequency domain interference sampled signals using a phase rotator means coupled to the phase selector means and the filter controller means, and denormalizing the phase rotated frequency domain interference sampled signals to generate frequency domain interference amplitude estimates in accordance with a frequency domain scale factor signal using a frequency domain amplitude selector means coupled to the phase rotator means.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
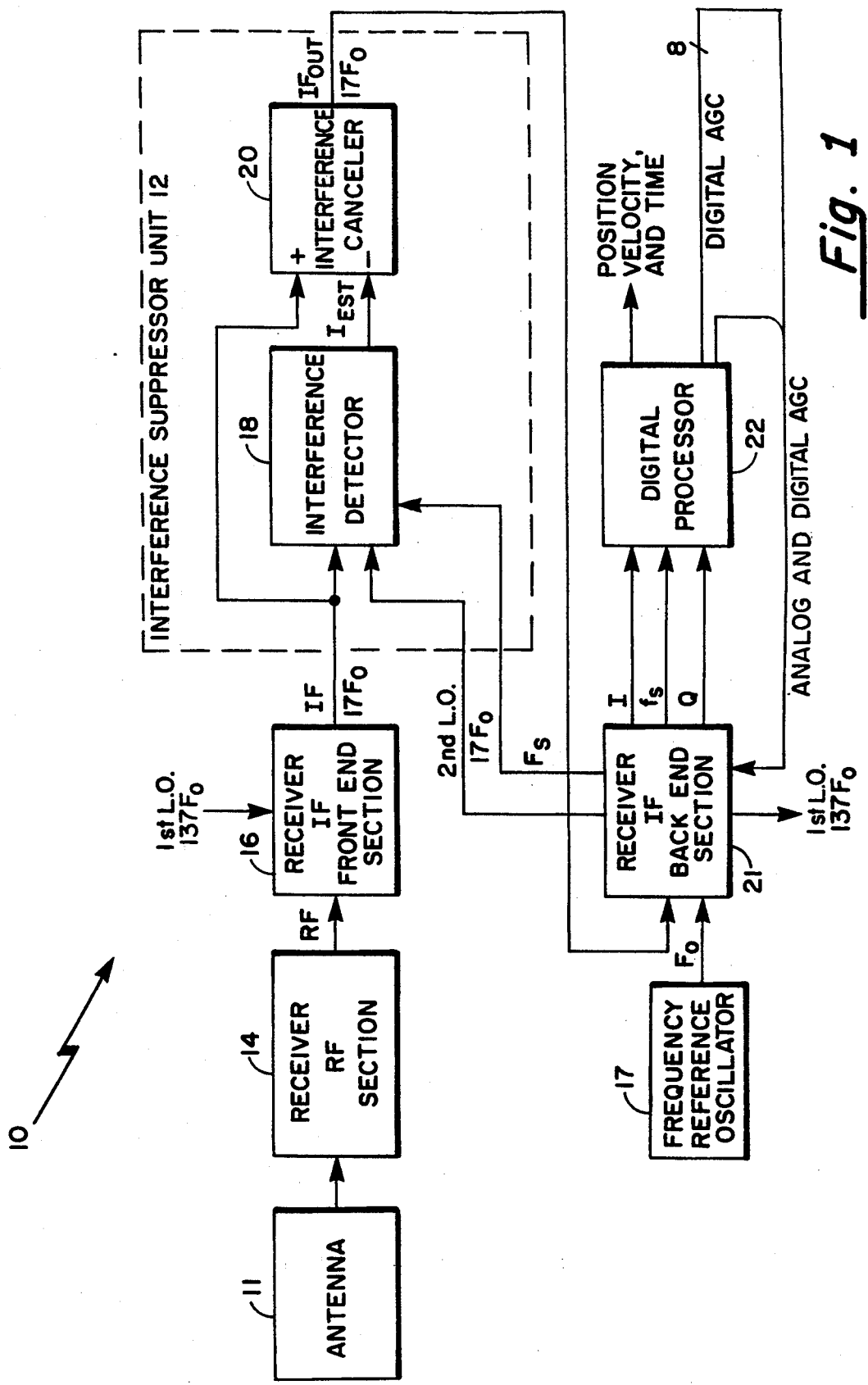
FIG. 1 is a block diagram showing the architecture of an interference suppressor receiver of the present invention for a Global Positioning System.

Referring now to FIG. 1, a block diagram is shown of a Global Positioning System (GPS) interference suppressor receiver 10 of the present invention comprising an antenna 11 coupled to a receiver RF section 14 having an RF output coupled to a receiver IF front end section 16. The IF output from the receiver IF front end section 16 is connected to an interference suppressor unit 12 which detects and removes interference signals. The output $IF_{OUT}$ from the interference suppressor unit 12 is fed to a receiver IF back-end section 21 which generates a sample clock ($f_S$) signal and I and Q signals which are processed by a digital processor 22. A frequency reference oscillator 17 generates an $F_o$ reference signal (10.23 MHz) which is fed to the receiver IF back end section 21 where a first local oscillator (L.O.) signal ($137F_o$) a second L.O. signal ($17F_o$) and a sample clock ($F_S$) are generated. The digital processor 22 generates position, velocity and time information and also an 8-bit digital AGC signal used by the interference suppressor unit 12 and an analog AGC signal used by the receiver IF back-end section 21. The interference suppressor unit 12, receiver IF back-end section 21 and digital processor 22 provide an amount of interference discrimination that enables the complete system to provide at least a 75 dB interference-to-signal (I/S) ratio with a fixed radiation pattern antenna (FRPA) and at least 100 dB I/S when another interference suppression technique is included in the system.

The antenna 11 receives a spread spectrum signal plus noise plus interference (S+n+I) and couples said signal to the receiver RF section 14 which amplifies the received signal and feeds it to the receiver IF front-end section 16 where the RF signal is down converted and match filtered to the information or spread spectrum bandwidth $F_o$. The IF output is a signal $17F_o$, where $F_o$ equals 10.23 MHz. This IF output comprising signal (S), noise (n) and interference (I) is coupled to an interference canceler 20 within the interference suppressor unit 12 and to an interference detector 18 where interference frequencies are detected and estimated. The interference estimate ($I_{EST}$) output of the interference detector 18 is fed to the interference canceler 20 where the estimated interference frequencies ($I_{EST}$) are removed from the $17F_o$ IF signal. The interference suppressor unit 12 comprising a digital design provides at least 25 dB interference discrimination. The $17F_o$ $IF_{OUT}$ signal from the interference canceler 20 is fed to the receiver IF back-end section 21 which generates the I and Q digital signals for the digital processor 21 to acquire and track a plurality of satellite vehicle transmitters. The receiver IF back-end section 21 uses automatic gain control (AGC) to hold the output power constant for tracking the received RF carrier to remove the doppler frequency and PN-code modulation in a plurality of signal processor channels. The digital processor 22 estimates the pseudo range and pseudo range rate of the GPS receiver relative to each satellite. It provides an analog and a digital automatic gain control (AGC) signal to the receiver IF back-end section 21 and the interference detector 18 respectively for controlling the interference null. The receiver IF back-end section 21 and digital processor 22 provide approximately 50 dB of interference discrimination. Hence, the GPS anti-jam receiver 10 is capable of providing greater than 75 dB of total interference discrimination with a fixed radiation pattern antenna 11 and the interference suppression unit 12.

The advantage of IF interference rejection is that it allows an A/D converter for an I and Q sampler in the receiver IF back-end section 21 to take advantage of the interference nulls due to the interference canceler 20. Such an IF sampler employs AGC as a measure of the canceled interference and is described in U.S. Pat. No. 4,972,430, issued Nov. 20, 1990, to Robert H Cantwell and assigned to Raytheon Company. This reduces the dynamic range required for the receiver IF back-end section 21 to acquire and track received signals. The disadvantage of digital baseband adaptive filters after the receiving IF back-end section 21 is that they do not allow reducing the dynamic range of the A/D converter in the receiver IF back-end section 21 by the depth of the null, because the interference rejection follows such A/D converter. This is the difference between being able to develop an A/D converter that works for signal acquisition and tracking in the receiver IF back-end section 21, and one that doesn't. Key components for system performance are comparators in the receiver IF back-end section 21 A/D converter (not shown but described in U.S. Pat. No. 4,972,430 and incorporated herein by reference). An A/D synthesizer which is part of the receiver IF back-end section 21 and also described in U.S. Pat. No. 4,972,430 interfaces with the $F_o$ frequency reference oscillator 17. The synthesizer portion of the A/D function in the receiver IF back-end section 21 generates the local oscillator signals (1st L.O. $137F_o$ and 2nd L.O. $17F_o$) and clocks required by the interference suppressor receiver 10. The digital processor 22 outputs comprise an Analog AGC signal and a 10 bit digital AGC word for IF gain control. The local oscillator signals and clocks are used for down conversion to IF and A/D sampling. Such receiver IF back-end section 21 comprises an IF amplifier and $17F_o$ bandpass filter before the A/D converter.

Figure 8A:
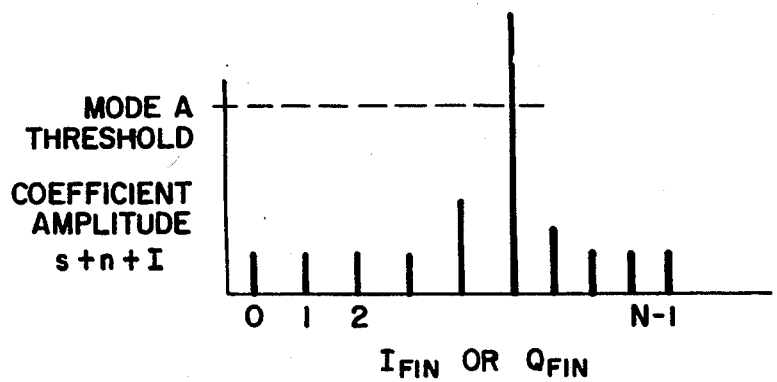
FIG. 8A is a graph showing a Mode A threshold amplitude relative to the frequency domain sampled amplitudes ($I_{FIN}$ or $Q_{FIN}$)

The Automatic Gain Control (AGC) signal adjusts the IF gain to maintain a constant power level at the A/D input in the receiver IF back-end section 21. The analog and digital AGC signal is generated by the digital processor 22 and fed to the receiver IF back-end section 21 to control the IF analog and digital AGC attenuators. The Mode A point in FIG. 8A is the I/S level at which the receiver 10 can track continuously and determines when the interference canceler 20 is enabled or disabled. The interference suppressor unit 12 nulls input interference levels greater than Mode A point shown in FIG. 8A. At less than a 75 dB I/S (interference-to-signal) at the input to the interference suppressor unit 12, the mode can be adaptively set to allow signal acquisition and tracking. High performance receivers provide signal acquisition to 32 dB I/S. The minimum interference rejection performance of 25 dB by the interference suppressor unit 12 provides a minimum overall acquisition capability of 32 dB+25 dB which equals 57 dB I/S. The input IF signal at the 8-bit A/D converters 26, 36 in down converter 23 is linear to the maximum received interference signal level required to be canceled. The receiver RF section 14 and the receiver IF front-end section 16 typically have enough gain to put this level at 0 dB for A/D conversion of the maximum received signal level.

The received signal (S) plus noise (n) and interference (I) level is set by the receiver RF section 14 and the receiver IF front-end section 16 gain for a peak signal (S) plus noise (n) plus interference (I) equal to 127 A/D levels at the 8-bit A/D 28, 36 output in down converter 22. For a peak sine wave the A/D RMS level is $127/\sqrt{2}$ A/D levels. The interference to one A/D level is 20 log $(127/\sqrt{2})$ which is equal to a 39 dB interference dynamic range with 8-bit A/D converters 28,36. A block of N frequency domain samples $I_{FIN}$ or $Q_{FIN}$ coefficient amplitudes of signal (S) plus noise (n) plus interference (I) are shown in FIG. 8A relative to the mode A threshold. The advantage of the time to frequency converter 40 using 256 samples to transform time domain samples to the frequency domain is the interference to noise improvement (INI) equal to twenty log base ten of the square root of the number of samples.

$$INI = 20 \log \sqrt{256} = 24 \text{ dB}$$

Figure 8B:
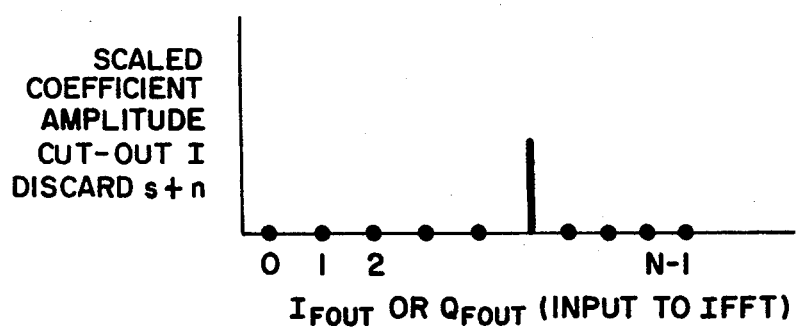
FIG. 8B is a graph showing the interference excisor outputs ($I_{FOUT}$ or $Q_{FOUT}$) scaled relative to the Mode A threshold.

The 24 dB improvement is equal to 4 bits of interference sample amplitude improvement. With the signal (S) and the noise (n) below the least significant bit (LSB) of the A/D, the most significant bits (MSBs) of the time to frequency converter 40 output (sign plus 10 bits are cut-out for the scaled interference sample amplitude estimate and the least significant (signal plus noise) bits are discarded as shown in FIG. 8B. With the A/D input at full scale and taking into account the interference to noise improvement for sign plus 10 bits, the overall dynamic range for interference cancellation is 20 LOB $(1023/\sqrt{2})$ which is equal to 57 dB. This theoretical upper bound for interference cancellation dynamic range increases by 6 dB per A/D bit as shown in Table 1.

each interference frequency $\omega_K$. The outputs $I_{FOUT}$ and $Q_{FOUT}$ of the interference excisor 42 are fed to a frequency to time converter 44 which converts the estimated interferences in the frequency domain back to the time domain. The digital $I_{OUT}$ and $Q_{OUT}$ signals on a time domain scale factor (TSF) from the frequency to time converter 44 are fed to an up converter 46 for final amplitude scaling and converting back to IF from baseband and generating the interference estimate ($I_{EST}$) signal which is coupled to the interference canceler 20. Frequency and time domain canceler enable signals 105 and 107 generated by the interference excisor 42 are also fed to the up converter 46 for controlling D/A converters 48, 52. The interference canceler 20 sums the $I_{EST}$ signal with the delayed IF signal from the receiver IF front end section 16 via a delay line 47 to cancel out the interferences 16 at IF producing $IF_{OUT}$ which comprises signal (S), noise (n) and interference residue ($I_R$) components. The interference suppressor unit 12 comprising the interference detector 18 and interference canceler 20 may be embodied with readily available off-the-shelf components.

Figure 2:
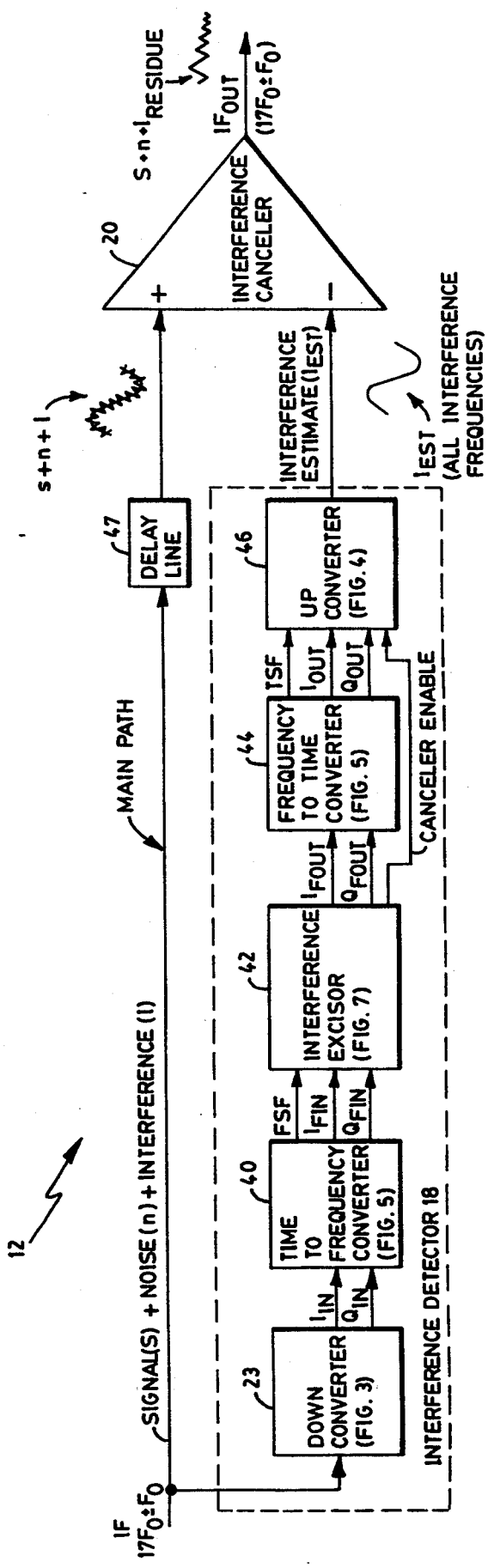
FIG. 2 is a block diagram of an interference detector 18 of the present invention shown coupled to an interference canceler 20.

The advantage of the interference canceler 20 in FIG. 2 is that only 39 dB dynamic range is required at the A/D converters 28, 36 input to detect and cancel the interferences. This is possible because the main IF path delayed in delay line 47 to the interference canceler 20 is the IF received signal. The received signal (S), noise (n) and interference (I) are all narrow-band zero mean stochastic processes which are the ensemble of time domain measurements taken alone or together. The interferences detected by an 8-bit A/D 28, 36 are

TABLE 1

| A/D BITS | A/D DYNAMIC RANGE dB | 256 SAMPLE INI CANCELLATION RANGE dB | INTERFERENCE CANCELLATION DYNAMIC RANGE dB |
|---|---|---|---|
| 7 | 33 | 18 | 51 |
| 8 | 39 | 18 | 57 |
| 9 | 45 | 18 | 63 |
| 10 | 51 | 18 | 69 |
| 11 | 57 | 18 | 75 |
| 12 | 63 | 18 | 81 |
| 14 | 75 | 18 | 93 |
| 15 | 81 | 18 | 99 |
| 16 | 87 | 18 | 105 |

Figure 8C:
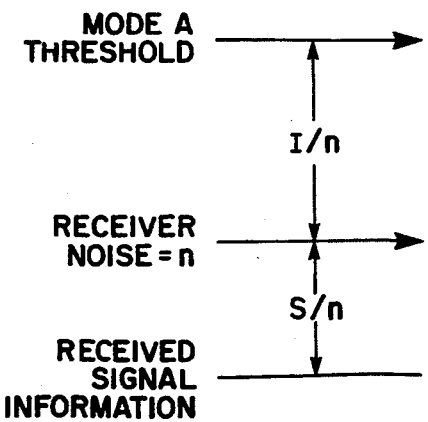
FIG. 8C shows the build-up to the Mode A threshold from the received signal information based on receiver noise (S/n) plus interferences (I/n)

Mode A threshold shown in FIG. 8C is the minimum interference to noise (I/n) level to which the received interference shall be suppressed at the output of the interference canceler 20. A typical GPS receiver 10 tracks correctly when the interference to noise is between 12 to 32 dB. The advantage of this is interference canceler 20 is always canceling interferences greater than the received signal plus noise and is never trying to cancel interferences below the noise level.

Referring now to FIG. 2, a block diagram of the interference detector 18 is shown with its input and output both coupled to the interference canceler 20. The interference detector 18 comprises a down converter 23 for converting the IF to baseband, generating the in-phase ($I_{IN}$) and the quadrature-phase ($Q_{IN}$) signals. The $I_{IN}$ and $Q_{IN}$ signals are fed to a time to frequency converter 40 which transforms the time domain samples to frequency domain samples. The frequency domain samples $I_{FIN}$ and $Q_{FIN}$ along with a frequency domain scale factor (FSF) are fed to an interference excisor 42 which identifies and cuts-out (excision) an estimate of the interferences (I) amplitude in the frequency domain by controlling the phase angle $\phi_K$ of canceled to at least 25 dB at the output of the interference canceler 20.

Figure 3:
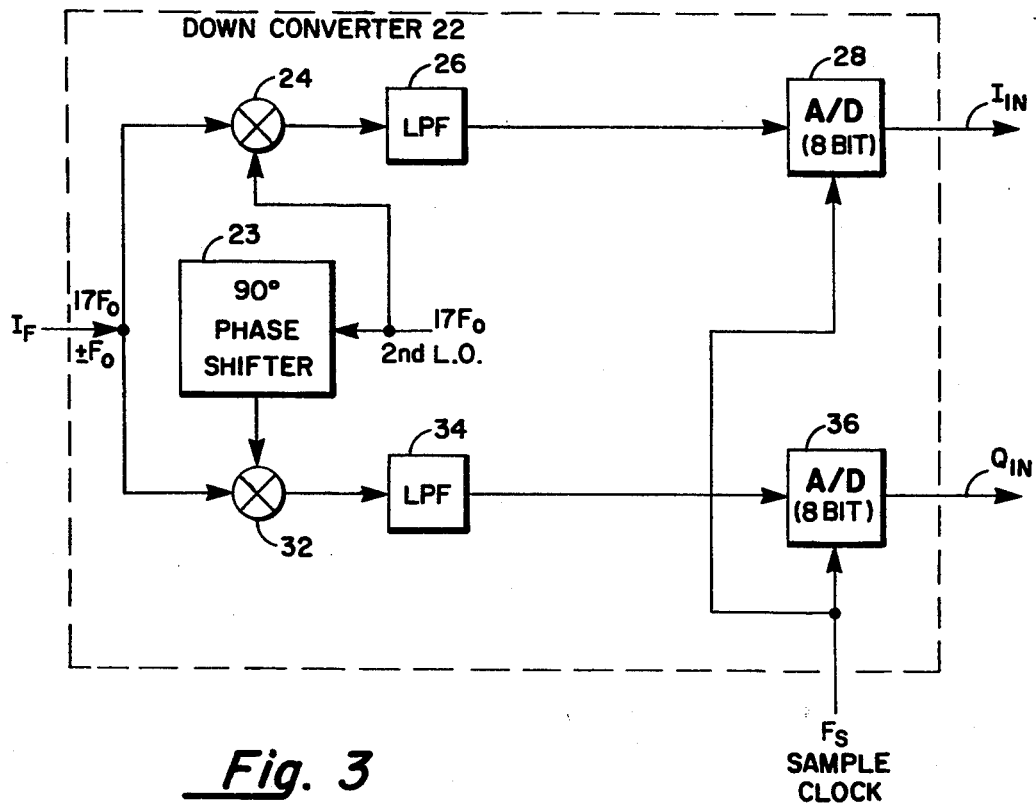
FIG. 3, is a block diagram of a down converter 23 shown in FIG. 2.

Referring now to FIG. 3, a block diagram of the down converter 22 is shown. The down converter 22 receives the $17F_o$ IF input signal and converts it to baseband by generating the in-phase ($I_{IN}$) and quadrature-phase ($Q_{IN}$) signals. The IF signal is fed to mixers 24, 32. A $17F_o$ 2nd local oscillator (L.O.) signal from the receiver IF back end section 21 is also fed to mixer 24 and to a 90° phase shifter 23. The output of the 90° phase shifter 23 is fed to mixer 32. The output of mixer 24 is fed to a low pass filter (LPF) 26 having an output that is connected to an 8-bit analog-to-digital A/D converter 28 which produces the digital word $I_{IN}$. The output of mixer 32 is fed to a low pass filter (LPF) 34 having an output that is connected to an 8-bit A/D converter 36 which produces the digital word $Q_{IN}$. A/D converters 28 and 36 each receive an $F_S$ sample clock for sampling the signal being converted. The LPF 26, 34 bandwidth is one-half the $F_S$ sample clock frequency for up-converting interferences above and below the $17F_o$ IF. The input I and Q phase detector portion of the down converter 23 in FIG. 3 comprising mixer 24, 32 and the 90° phase shifter 23 which receives the $17F_oIF$ input may be embodied by Model No. IQS-2A-173.91 manufactured by Merrimack of West Caldwell, N.J. Such I and Q phase detector provides image sideband rejection of at least 35 dB. The 8-bit I and Q A/D converters 28, 36 provide up to 39 dB of interference rejections.

Figure 4:
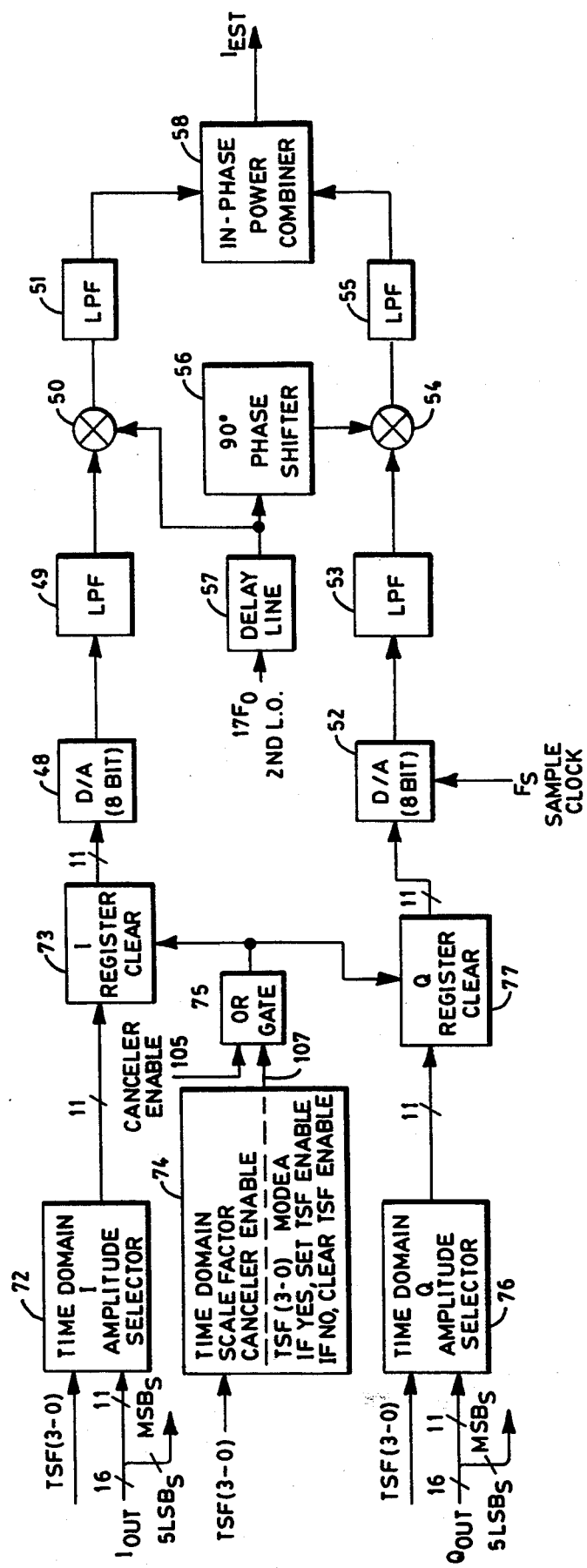
FIG. 4 is a block diagram of an up converter 46 shown in FIG. 2.

Referring now to FIG. 4, a block diagram of the up-converter 46 is shown. The up-converter 46 receives digital data words $I_{OUT}$ and $Q_{OUT}$ from the frequency to time converter 44 and converts the information from baseband back to IF and generates the interference estimate ($I_{EST}$) signal. The $I_{OUT}$ and $Q_{OUT}$ data are coupled to the time domain amplitude selectors 72, 76 used to denormalize the 11 MSBs of the block floating point inverse FFT out interference amplitude estimate to a binary two's compliment fixed point interference amplitude estimate that is registered in I and Q registers 73, 77. The IF frequency and time domain canceler enable signals are enabling the IF canceler 20 for interference cancellation. The circuit implementation using PALS is the same as the frequency and time domain amplitude selectors 69, 74. The I and Q register 73, 77 are coupled to the 11-bit digital-to-analog D/A converters 48 and 52 respectively and the D/A converters are enabled by a canceler enable signals 105 and 107. The canceler enable signals 105 and 107 are generated by a filter controller 60 (FIG. 11) and by the up converter 46. The canceler enable signal 105 and 107 are low for a disable state. When disabled, canceler enable keeps $I_{est}$ equal to zero by clearing I and Q registers 73, 77 in order to keep from canceling interferences below the received noise level during normal operation or when a pulsed interference blinks off. An example of this is when receiver 10 is located near a pulsed Doppler radar. The output of D/A converter 48 is fed to a low pass filter (LPF) 49 having an output connected to a mixer 50. The output of D/A converter 52 is fed to a low pass filter (LPF) 53 having an output connected to a mixer 54. A $17F_o$ 2nd L.O. signal delay line 57, is matched to the main path delays for L.O. delay and is fed to mixer 50 and to a 90° phase shifter 56. The output of the 90° phase shifter 56 is fed to mixer 54. The mixer 50 up converts the in-phase signal component to IF. The mixer 54 up converters and phase shifts the quadrature-phase component 90° to be in-phase. The outputs from mixers 50 and 54 are fed to an in-phase power combiner 58 which combines the signals to generate the interference estimate ($I_{EST}$) at IF. The mixers 50, 54, 90° phase shifter 56 and in-phase power combiner 58 in up-converter 46 in FIG. 4 may be embodied by a single sideband modulator integrated network Model No. SSP-IR-173.81 manufactured by Merrimack of West Caldwell, N.J. Such integrated network provides image sideband rejection of at least 35 dB.

Figure 5:
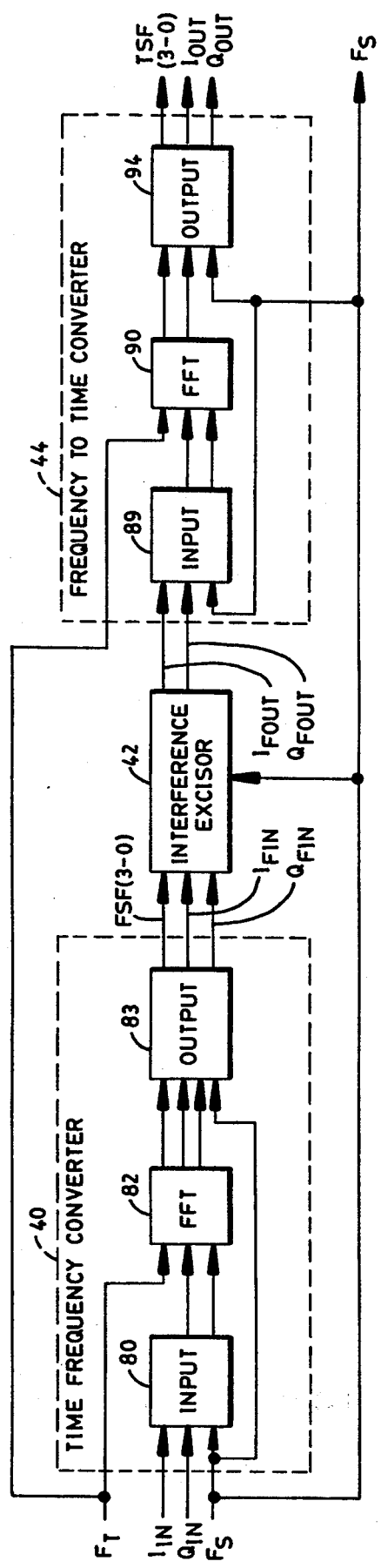
FIG. 5 is a block diagram showing the functional organization of the time to frequency converter 40 and the frequency to time converter 44 coupled to the interference excisor 42 shown in FIG. 2.
Figure 6:
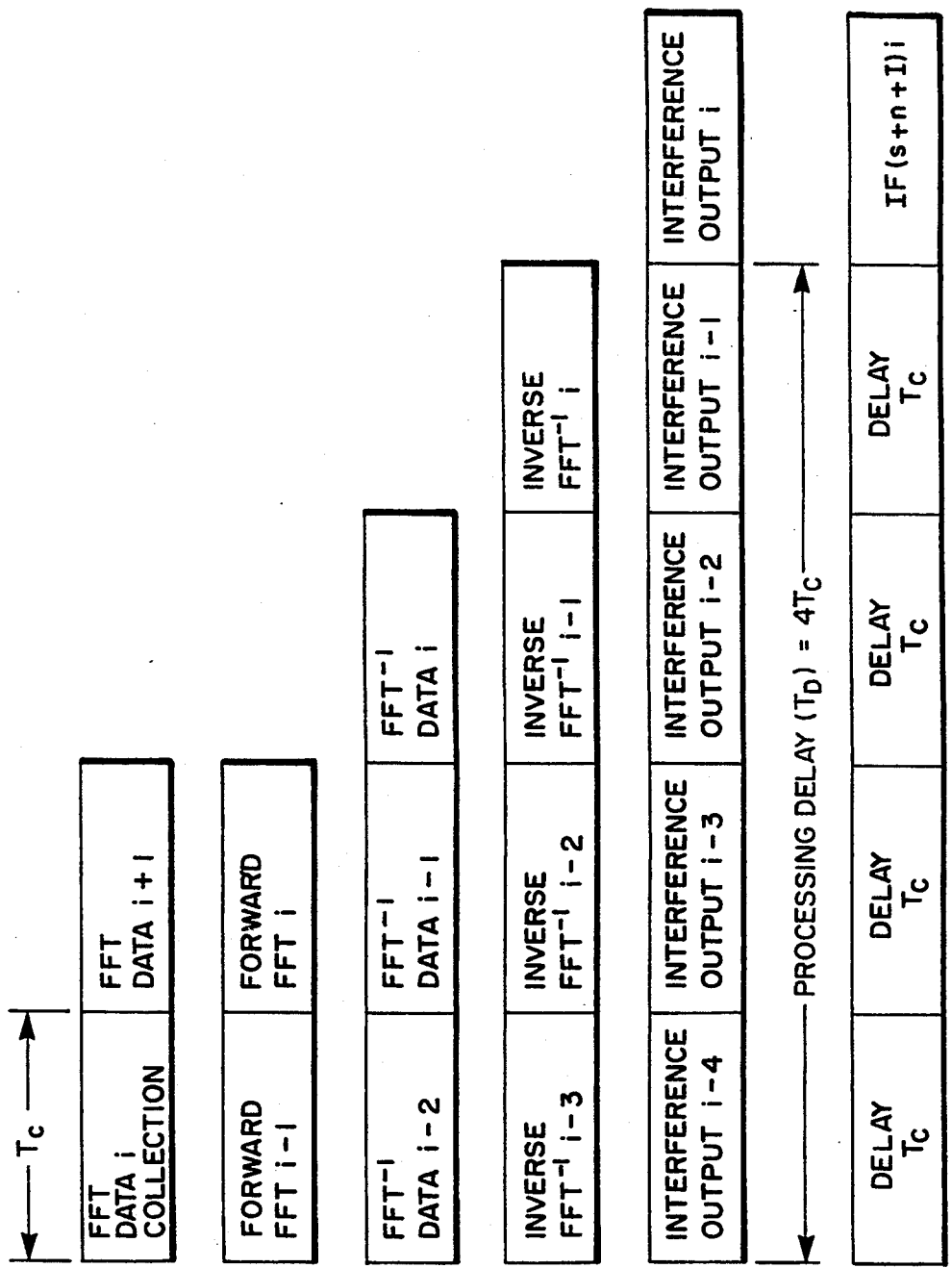
FIG. 6 is a timing diagram of the interference detector shown in FIG. 2.

Referring now to FIG. 5, a block diagram of the time-to-frequency converter 40 is shown which comprises a forward fast Fourier transform (FFT) 82 to transform the time domain samples to frequency domain samples. The outputs $I_{FIN}$ and $Q_{FIN}$ from the time to frequency converter 40 are fed to the interference excisor 42 which identifies and cuts out an estimate of the interference signals in the frequency domain by controlling the frequency response and phase. The interfering signals are excised (cut out) and saved while the received noise and information signals are discarded, FIG's 8A, 8B and 8C. The frequency domain output amplitude gain and phase are set by the amplitude selector 74 and a phase rotator 68 shown in FIG. 7. The interference samples $I_{FOUT}$ and $Q_{FOUT}$ are inverse FFT transformed by the frequency to time converter 44 to produce a time domain replica of the interferences. Timing for FIG. 5 is shown in FIG. 6 where it shows that the processing delay $T_D$ is time equal to 4 times the data collection time ($T_C$). The data collection time $T_C$ is the time to collect a block of N samples at the $F_S$ sampling rate. The FFT time at the transform clock $F_T$ rate plus half the interference excisor 42 $F_S$ sample clocks are also equal to $T_C$ in time. The FFT output to the inverse FFT is a block of N frequency domain samples at the $F_S$ sample rate for the third $T_C$ time. The fourth $T_C$ time is the inverse FFT time at the $F_T$ clock rate plus half of the interference excisor 42 $F_S$ clock sample time.

Still referring to FIG. 5, the FFT 82 used for the time to frequency converter 40 employs block floating point arithmetic. The I and Q data are each two's compliment number sign extended to 16 bits. After each pass of the FFT the number of sign bits in the largest result is recorded. Before the next pass, data is shifted left (multiplied by 2), once for every extra bit in this recorded sample. At least one two's compliment number in the block then fully occupies the 16-bit FFT word, and maximum data accuracy is preserved. The length of the input and output data words is 16-bits for the particular FFT chip selected with the internal FFT 82 arithmetic calculation results to 18-bits. With only 8-bit A/D dynamic range required, a custom integrated circuit chip may be designed for the FFT 82, interference excisor 42 and inverse FFT 90 implemented to take advantage of this fact to reduce gate count and power. With 11-bit input and output word lengths for dynamic range and 13-bits for internal FFT 82 arithmetic, an 8-bit A/D 28, 36 input (FIG. 3) and a denormalized 11-bit inverse FFT output to D/A converters 48, 52 (FIG. 4), the full 8-bit A/D dynamic range and FFT interference to noise improvement is preserved. The extra two bits allow word growth in any pass of the inverse FFT 82 to always maintain 11 significant digits before block floating point normalization for the next pass. As the CMOS gate size gets smaller (i.e. 0.6 microns), the gate size and power decrease. This provides for a custom chip to include both the time to frequency converter 40, frequency to time converter 44 and interference excisor 42 shown in FIG. 5 to be on a single die and in a single integrated circuit package with external ROMS for phase selector 70.

The advantage of the fast Fourier transform is the block of samples transformed to the frequency domain by the forward FFT 82 and then transformed back to the time domain with the inverse FFT 90 are identical sample for sample except for arithmetic quantization errors when the interference excisor 42 passes the data from the forward FFT 82 to the inverse FFT 90 multiplied by 1. By using block floating point the arithmetic quantization errors are negligible.

When a block of N samples are transformed directly, this is a rectangular window. If a window operator is used, the input samples $I_{IN}$ and $Q_{IN}$ are scaled by a weighting functions applied to the input time domain data samples before the forward FFT 82, then the inverse FFT 90 output has the same shape as the windowed input samples. The inputs to the interference canceler 20 are continuous for signal (S)+noise (n)+interferences (I). The interference estimate ($I_{EST}$) also wants to be continuous and for this reason window operators are not used for canceling interferences.

The block floating point scale factor normalizes the input data block of N samples. The largest sample in the block is left justified so that the sign bit exclusive-or'd with the most significant bit is a logic 1. The input block of data to the inverse FFT 90 is denormalized by the frequency scale factor (FSF(3-(0)) from FFT 82, and therefore, the scale factor Output of the inverse FFT 90 TSF (3-(0) is the amplitude estimate floating point exponent. The scale factor of the forward FFT 82 output is a measure of the received interference amplitude and the AGC level is a measure of the interference cancellation. The normalized forward FFT scale factor FSF(3-(0) is as shown in Table 2.

TABLE 2

| NORMALIZED SCALE FACTOR FSF(3-0) | ATTENUATION (dB) |
|---|---|
| 0 | MAX INTERFERENCE |
| 1 | |
| 2 | |
| 3 | |
| 4 | |
| 5 | TYPICAL MODE A THRESHOLD |
| 6 | |

The normalized inverse FFT 90 output from the frequency to time converter 44, $I_{OUT}$ and $Q_{OUT}$, are denormalized in the time domain amplitude selector 74 using the time domain block floating point scale factor TSF(3-(0). Before up-conversion, the $I_{OUT}$ and $Q_{OUT}$ interference levels are denormalized by the scale factor to set the input to output gain of the interference detector 18 equal to one. This is accomplished by using the forward FFT 82 scale factor signal FSF(3-(0) to denormalize the interference excisor 42 output $I_{FOUT}$ and $Q_{FOUT}$, a measure of the interference level. Now the inverse FFT output 94 TSF(3-(0), $I_{OUT}$ and $Q_{OUT}$ are the floating point interference amplitude estimate after denormalizing $I_{OUT}$ and $Q_{OUT}$ sign extended by the TSF(3-(0) you have the fixed point interference amplitude estimate. Now $I_{EST}$ is approximately equal to the main path interference estimate that after up converting is the interference amplitude estimate $I_{EST}$.

Figure 7:
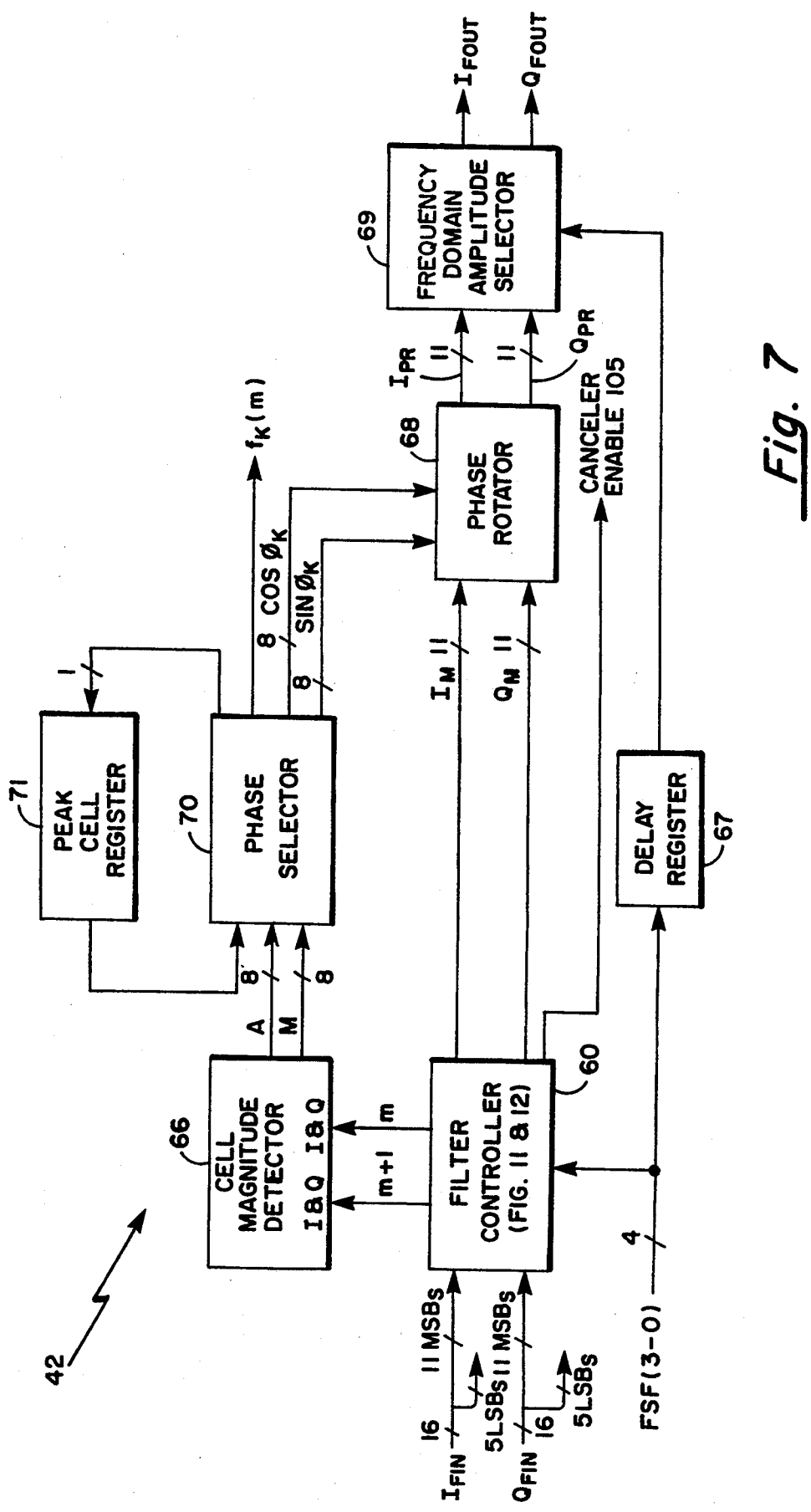
FIG. 7 is a block diagram of an interference excisor 42 of the present invention shown in FIG. 2.

Referring now to FIG. 7 and FIG. 2, the main path analog IF input to the interference canceler 20 and to the interference detector 18 are all a zero mean continuous stochastic process. The interference estimate ($I_{EST}$) output of interference detector 18 is also continuous.

The continuous analog IF input to interference detector 18 is down converted to in-phase and quadrature-phase and converted to continuous stream of digital samples in down converter 22. The time to frequency converter 40 shown in FIG. 5 continuously blocks the input time domain samples $I_{IN}$ and $Q_{IN}$ into blocks of N samples to be transformed to the frequency domain by FFT 82. The block floating point FFT output 83 is also continuous frequency domain samples at the A/D 28, 36 sample rate $F_S$. The FFT output 83 is the input to the interference excisor 42 shown in FIG. 7.

Figure 9:
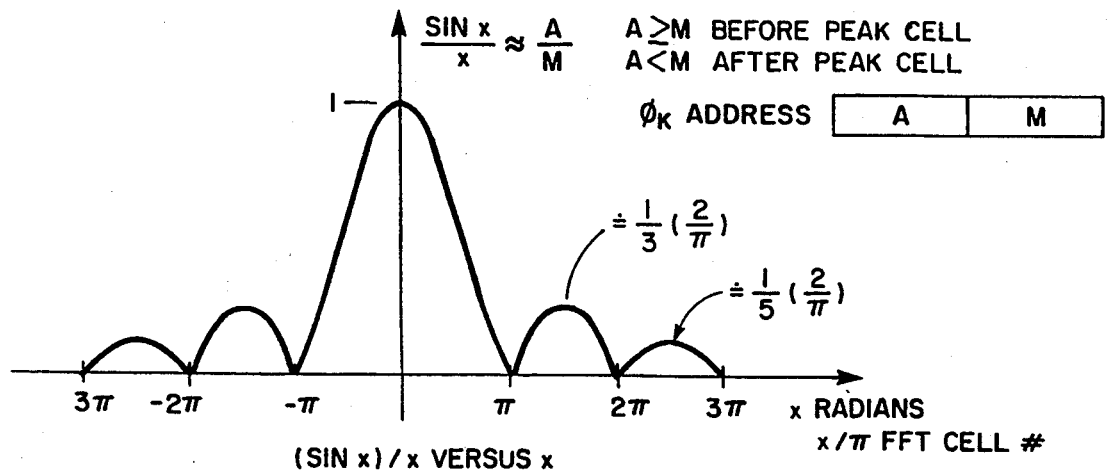
FIG. 9 shows a (sin x)/x frequency response to rectangular block of N time domain samples transformed to the frequency domain.

Referring to FIG's 9 and 10, FIG. 9 shows the sin X/X frequency domain response envelope of the discrete I and Q magnitude outputs for all possible values when the block of N samples are transformed directly, a rectangular window. The rectangular window function is used to interpolate between adjacent frequency domain samples A and M, to estimate the phase rotation angle $\phi_K$ required for cancellation. Each interference frequency is phase shifted to make up for the processing time delay $T_D$ difference between the main path to the interference canceler 20 and the interference detector 18. When the processing delay $T_D$ is an integer number of data collection times $T_C$, the phase $\phi_K$ is a linear function which repeats from one frequency bin or cell to the next one. Register M+1 126, 136 is adjacent to register M 128, 138 or the main register. After the cell magnitude detector 66, the magnitudes A and M and the peak cell register 71 are used to address a table look-up ROM, phase selector 70 to access $\phi_K$. $\phi_K$ in phase selector 70 is an address input to two more ROMs to access $\cos\phi_K$ and $\sin \phi_K$ for input to phase rotation 68. The main I and Q signals are delayed in delay registers 130, 144 as is FSF(3-(0) in delay register 57 for alignment in time to the time delays for the number of $F_S$ clock delays required to generate A and M magnitudes and access $\cos\phi_K$ and $\sin\phi_K$. After each frequency domain sample is phase rotated the block floating point normalized phase rotated samples are denormalized by the frequency domain amplitude selector 74 using the delayed scale factor FSF(3-(0) for the frequency domain interference amplitude estimate.

Referring now to FIG. 7, the inputs $I_{FIN}$ and $Q_{FIN}$ to the interference excisor 42 are coupled to a frequency controller 74. These signals are received from the time to frequency converter 40 where the time domain samples are transformed to frequency domain samples. The interference excisor 42 cuts out an estimate of the interference in the frequency domain by discarding the signal (S) and noise (n), the 5 LSB's. The interfering signals are excised (cut out) and saved while the received noise and information signals are discarded at the input to frequency controller 60 as shown in FIGS. 7, 8A, 8B and 8C.

Figure 10:
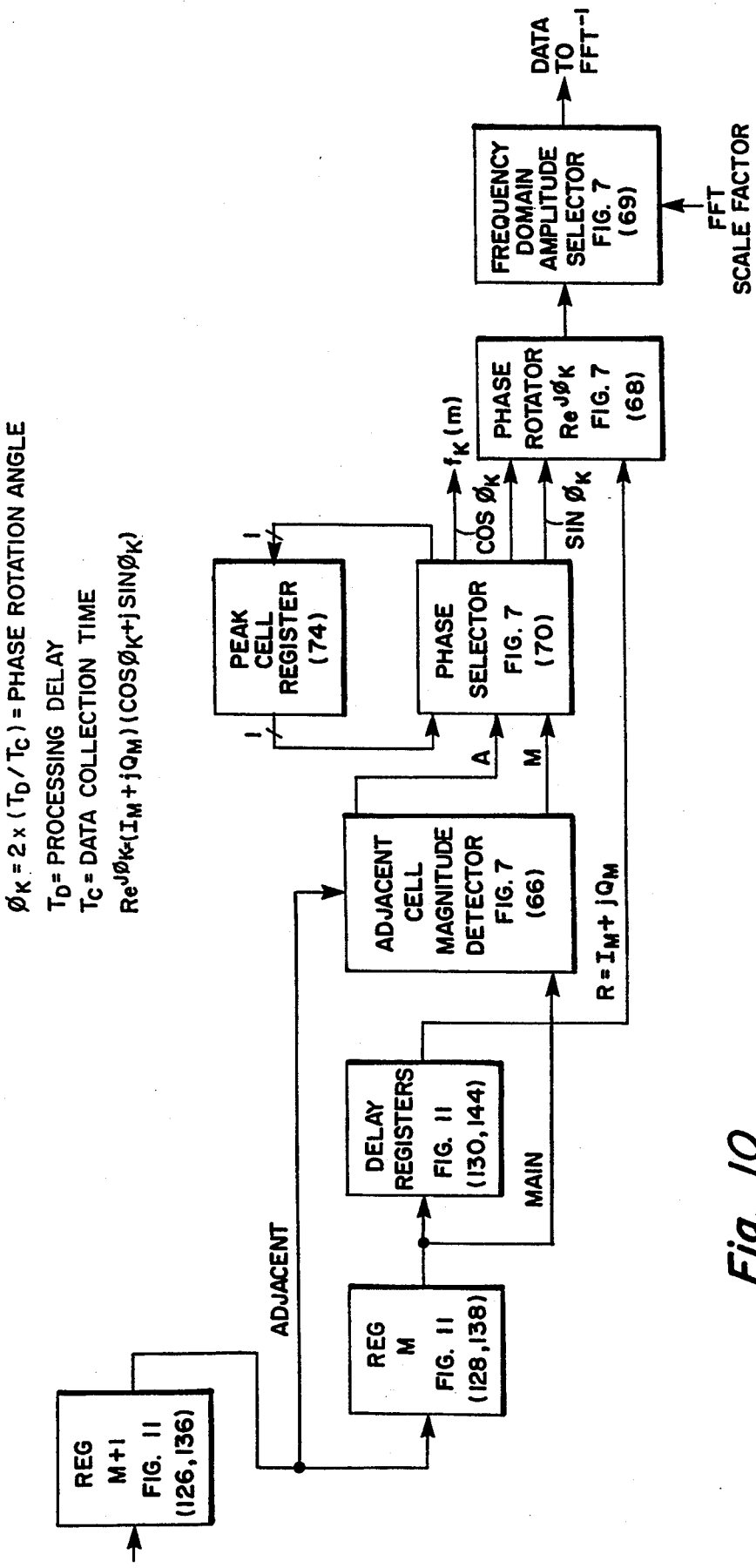
FIG. 10 is a simplified functional block diagram of a portion of the interference excisor 42 comprising the filter controller 60 in FIG. 7 which includes a frequency coefficient output controller 102 shown in FIG. 11.
Figure 11:
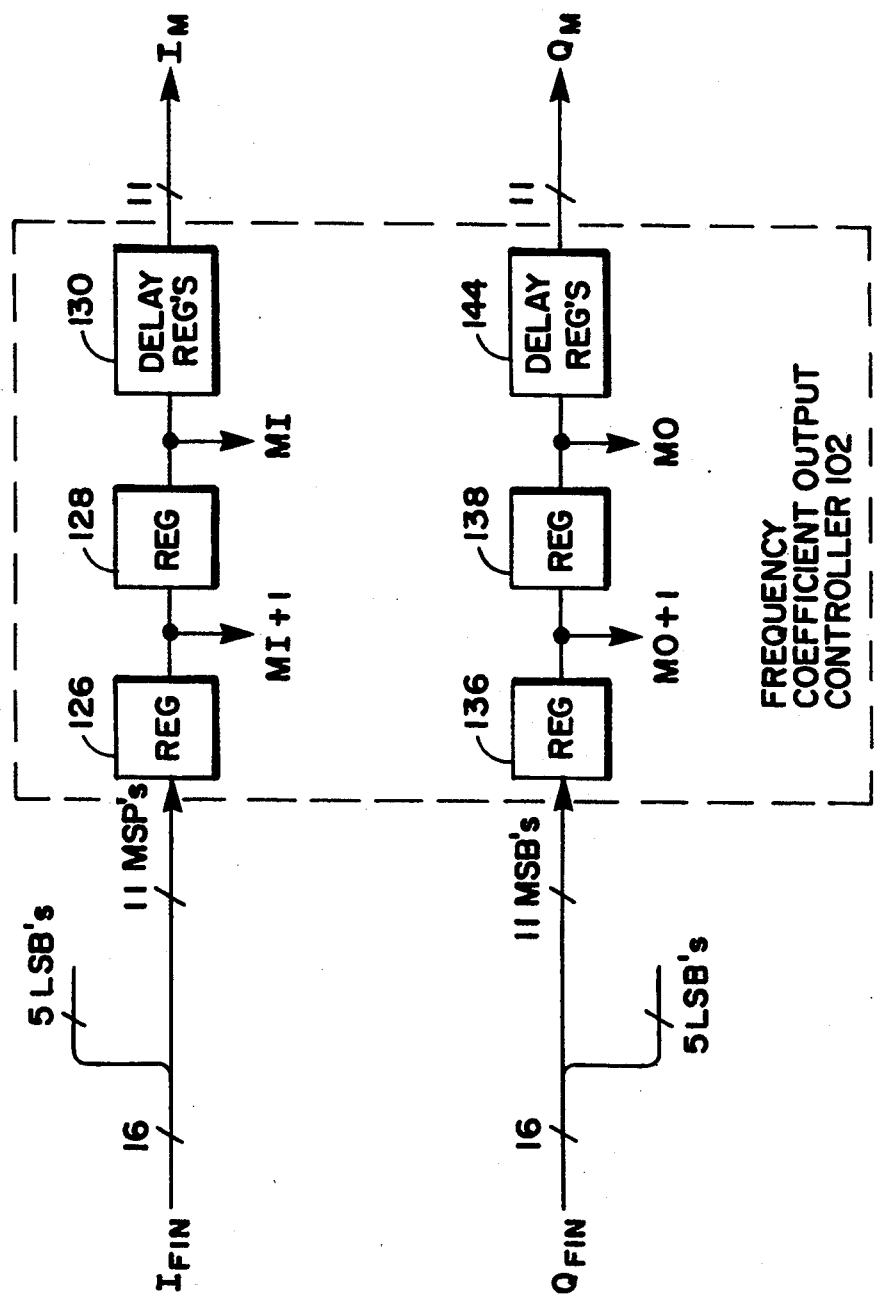
FIG. 11 is a block diagram of a frequency coefficient output controller 102 of the filter controller 60 shown in FIG. 7.
Figure 12:
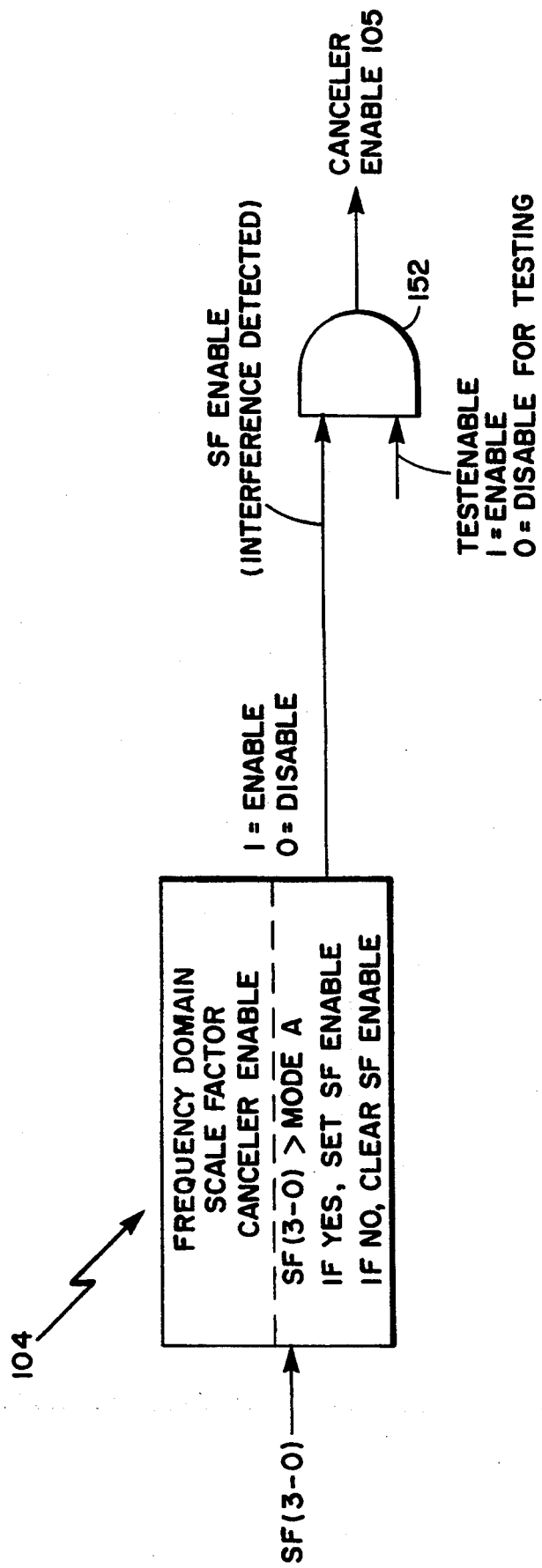
FIG. 12 is a block diagram of an block floating point scale factor discriminator for pulsed interferences 104 of the filter controller shown in FIG. 7.

Still referring to FIG. 7 and FIG. 10, the filter controller 60 shown in FIG. 11 and 12, receives the frequency domain $I_{FIN}$ and $Q_{FIN}$ sampled signals from the time to frequency converter 40 and generates $I_M$ and $Q_M$ which after phase rotator 68 and denormalized by amplitude selector 69 are an estimate of each interference in the frequency domain. $I_M$ and $Q_M$ are fed to the phase rotator 68. The filter controller also generates delayed signals m+1 and m where m represents a main cell for MI and MQ, m+1 represents an adjacent cell for MI+1 and MQ+1 and the delay registers 130, 144 represents a number of delays used to align the sample M with the phase rotation $\cos\phi$ and $\sin\phi_K$ for this sample. The m+1 and m signals coupled to the cell magnitude detector calculates the adjacent cell A and main cell M magnitudes. The A and M signals are fed to a phase selector 70 which determines the phase rotation angle $\phi_K$ of each interference sampled signal and generates $\cos \phi_K$ and $\sin \phi_K$ signals. The phase selector 70 also generates an $f_K(m)$ signal which represents the interference frequency of a cell or the fractional position in the cell between this cell and the next cell. The $I_M$ and $Q_M$ samples from the filter controller 60 are delayed by delay registers 130, 144 for alignment in time with the phase rotation angle $\phi_K$ from the phase selector 70. The interference samples are phase rotated by $\phi_K$ to account for the phase difference between the main path to the interference canceler 20 and passing through the interference detector 18. The phase rotator 68 phase rotates the block floating point samples by an estimate of the phase delay for each interference frequency by $\phi_K = \omega_K T_D$. The frequency domain amplitude selector produces a denormalized fixed point estimate of the interference amplitude, a typical implantation uses 22V10 PALS. The reason for this is for the final time domain amplitude selector 72, 76 is independent of the FFT transform block floating point scale factor FSF(3-0). Now sample clock by sample clock provides continuous output samples of the interference to be up converted for continuous analog IF cancellation by the interference canceler 20. The frequency domain amplitude selector 69 produces interference sample signals $I_{FOUT}$ and $Q_{FOUT}$ which are then converted back to the time domain.

The phase rotation of the interference frequencies is a novel feature of the present invention. Phase rotation corrects the phase difference between the main path IF (S+n+I) fed to the (+) input of the interference canceler 20 and the interference detector 18 output, $I_{EST}$ fed to the (−) input of the interference canceler 20 as shown in FIG. 1 and FIG. 2. To a first approximation the signals are continuous and approximately the same frequency over at least one processing delay ($T_D$). For interfering signals to effect the receiver, this interval has to be typically greater than 50 microseconds. This limits the number of points that can be transformed which determine the size of the frequency bins in the forward FFT 82 output coefficients. The phase rotation delay required is:

$$\phi_K = \omega_K T_D$$

where,
$\phi_K$ = phase delay (or phase rotation angle) for a particular interfering frequency
$\omega_K$ = Interfering frequency in radians per second
$T_D$ = Processing delay (which is equal to data collection, forward FFT, interference excisor 42, and inverse FFT processing times).

$$K = m + f_K$$

where,
m = the FFT bin number or coefficient (0 to N−1)
N = Number of points in the FFT
$f_K$ = the fractional part of the distance between two FFT frequency bins.

The phase delay or phase rotation angle ($\phi_K$) required is:

$$\phi_K = 2\pi(F_S/N) \cdot K \cdot T_D \text{ modulo } 2\pi$$

When $T_D$ is equal to twice the data collection time, the phase rotation angle starts at zero and increases to $2\pi$ radians or zero again when the interfering frequency is at one half the frequency bin. From one half a frequency bin to the next frequency bin the phase is modulo $2\pi$ again increasing from zero to $2\pi$ radians. When the processing delay $T_D$ is equal to M times the data collection time, the phase rotation angle repeats 0 to $2\pi$ M times from one frequency bin to the next, when M is an integer.

The data collection time is equal to $2T_C$, one $T_C$ for collecting the forward FFT data and one $T_C$ for collecting the inverse FFT data. The processing delays ($T_D$) of most interest are when $T_D = 4T_C$, $T_D = 3T_C$, $T_D = 3.5T_C$ and $2T_C$ when $T_D = 4T_C$ the processing time for the forward FFT, the inverse FFT and the interference excisor 42 is $2T_C$. The timing is shown in FIG. 6 and the interference excisor 42 is shown in FIG. 7.

When $T_D = 3T_C$, the processing time for the forward FFT, inverse FFT and interference excisor 42 is $T_C$, a lower bound for continuous input and output samples without using delay lines 47, 57 in the main path with $T_C$ or $2T_C$ delay times.

When $T_D = 3.5$, $T_C$ the phase rotation required to cancel interferences frequency repeats zero to $2\pi$ radians 3.5 times from one frequency bin to the next and repeats 7 times between two frequency bins. In this case the phase is linear and repeats for every other pair of frequency bins. The main path to the interference canceler 20 shown in FIG. 2 is a continuous analog input. The interference estimate ($I_{EST}$) input to the interference canceler 20 is also a continuous analog input. This requires the input samples $I_{IN}$, $Q_{IN}$ and the output samples $I_{OUT}$, $Q_{OUT}$ to also be continuous at the $F_S$ sample clock rate. The forward FFT 82 and the inverse IFFT 90 transform clock ($F_T$) shown in FIG. 5 is typically a higher frequency clock than $F_S$. The advantage of a high frequency transform clock is a reduced processing time $T_D$. The interference detector 18 employs a Model No PDSP16510 FFT processor manufactured by GEC Plessey Semiconductor of Scotts Valley, Calif. for the forward FFT 82 and the inverse FFT 90. The critical parameter is the sampling frequency $F_S$ in order to operate with continuous inputs and outputs. The sample clock frequency operates at up 12.35 MHz with one PDSP16510 FFT processor for the forward FFT 82 and one such FFT processor for the inverse FFT 90. The parameters for sampling up to 12.35 MHz are as follows:

$$F_S \leq \frac{F_T \text{ (Number of } F_S \text{ Clocks)}}{\text{Number of } F_T \text{ clocks}} \leq 40 \text{ (252/816) MHz}$$

$F_T$ FFT and Inverse FFT Transform Clock
$F_S$ Sample Clock
$F_S \leq 12.35$ MHz
$T_D = 1024$ $F_S$ Clocks
$T_C = 256$ $F_S$ Clocks
Forward FFT = 252 $F_S$ Clocks (816 $F_T$ Clocks)
Interference Excisor = 8 $F_S$ Clocks
Inverse FFT = 252 $F_S$ Clocks (816 $F_T$ Clocks)

The PDSP16510 FFT processor chips can be used at 20.46 MHz sampling if 4 chips are used. The embodiment shown in FIG. 5 would have to be repeated. Each pair of FFT chips would perform either the even blocks of 256 points or the odd blocks of 256 points. The outputs would be the same wherein the even block is followed by the odd block of 256 output samples for continuous outputs fed to up converter 46 at the $F_S$ sample rate. The parameters required for sampling at 20.46 MHz using one forward FFT 82 and one inverse FFT 90 are as follows:

$$\text{Number of } F_T \text{ clocks} = \frac{F_T \text{ (Number of Clocks)}}{F_S} =$$

$$\frac{40.96}{20.46}(252) =$$

$F_S = F_T/2 = 20.46$ MHz
$T_D = 1024$ $F_S$ Clocks (50 microseconds)
$T_C = 256$ $F_S$ Clocks
Forward FFT = 252 $F_S$ Clocks (504 $F_T$ Clocks)
Interference Excisor 32 8 $F_S$ Clocks Inverse FFT=252 $F_S$ Clocks (504 $F_T$ Clocks)

Referring now to FIG. 9 and FIG. 10, the requirement is to interpolate between the adjacent A and the main M frequency coefficients to find the interfering frequency phase rotation angle ($\phi_K$). The block of input data is equivalent to being multiplied by 1 for all input samples in the block and zero for all samples outside of the input block of samples. This rectangular block of N samples has a (sin x)/x frequency response (FIG. 9). This interpolation technique works for any delay $T_D$. The simplest implementation is for $T_D$ be equal to four times the data collection time ($T_C$) as shown in FIG. 6. The phase rotation angle ($\phi_K$) and the normalized (sin x)/x response for a few discrete fractional frequency bins are shown in Table 3.

TABLE 3

| FREQUENCY COEFFICIENT BIN | PHASE ROTATION ANGLE $\phi_K$ (DEGREES) | NORMALIZED SIN X/X AMPLITUDE DIFFERENCE |
|---|---|---|
| m + 1.00 | 0.00 | 1.0 |
| m + 1.05 | 72.00 | 1.0 |
| m + 1.10 | 144.00 | 0.98 |
| m + 1.15 | 216.00 | 0.96 |
| m + 1.20 | 288.00 | 0.94 |
| m + 1.25 | 0.00 | 0.90 |
| m + 1.30 | 72.00 | 0.86 |
| m + 1.35 | 144.00 | 0.81 |
| m + 1.40 | 216.00 | 0.76 |
| m + 1.45 | 288.00 | 0.70 |
| m + 1.50 | 0.00 | 0.64 |
| m + 1.55 | 72.00 | 0.57 |
| m + 1.60 | 144.00 | 0.50 |
| m + 1.65 | 216.00 | 0.44 |
| m + 1.70 | 288.00 | 0.37 |
| m + 1.75 | 0.00 | 0.30 |
| m + 1.80 | 72.00 | 0.23 |
| m + 1.85 | 144.00 | 0.17 |
| m + 1.90 | 216.00 | 0.11 |
| m + 1.95 | 288.00 | 0.05 |

The next $F_S$ clock moves the FFT data through the M+1 and M delay registers (128 and 126 in FIG. 11) for in-phase I data and delay registers (138 and 136 in FIG. 11) for quadrature-phase Q data. The output of delay registers 130 and 144 are the interference I and Q samples to be phase rotated and eventually canceled.

The delay registers are the frequency coefficient output controller 104 (FIG. 11) used to pipeline the data through in normal order to determine the phase rotation angle ($\phi_K$). The main cell M, adjacent cell A and peak cell register 71 are used to address a read-only-memory (ROM) table. Each address location provides a unique phase rotation angle ($\phi_K$). An L-bit phase rotation angle provides a phase resolution of $360/2^L$. The (sin x)/x rectangular FFT output frequency response shown in FIG. 9 determines the phase rotation angle ($\phi_K$) required for interference cancellation. In general, the processing delay $T_D$ is equal to a number of data collection times and the phase rotation angle is determined as follows:

$$\phi_K = 2K[T_D/T_C] \text{ modulo } 2\pi$$

where:

(sin x)/x defines x

Table 3 shows discrete values of the normalized (sin x)/x response versus the phase rotation angle $\phi_K$. A functional diagram of a portion of the interference excisor 42 for determining the phase rotation angle ($\phi_K$) and phase rotator 68 and frequency domain amplitude selector 69 is shown in FIG. 10 which generates the FFT output data for the inverse FFT. The complex FFT in-phase and quadrature-phase input, $I_{FIN}$ and $Q_{FIN}$, to the interference excisor 42 are in normal order, i.e. first output is frequency coefficient 0 followed by 1, 2, 3 to N−1, then 0, 1, 2, 3 to N−1 for the next block of data. The inputs and outputs are continuous at the $F_S$ sample clock rate. The next $F_S$ clock moves the FFT data through the delay registers (130, 128, 126) shown in FIG. 11 for in-phase I data and delay registers (144, 138, 136) for quadrature-phase Q data to be phase rotated and subsequently canceled.

An 8-bit phase rotation angle provides a phase resolution of 360/256 ($T_D/T_C$) or 5.6 degrees for $T_D/T_C=4$. Each additional phase bit reduces the phase resolution by a factor of 2. Taking the ratio of A/M normalizes the numbers for any size analog to digital (A/D) converters 28, 36 (FIG. Table 4 shows a few discrete values of the frequency domain samples normalized to x/$\pi$ when cell M is the main cell and A is the adjacent cell.

TABLE 4

| X/$\pi$ | CELL M | ADJACENT CELL A | RATIO A/M |
|---|---|---|---|
| 0.00 | 1.00 | 0.00 | 0.00 |
| 0.05 | 1.00 | 0.05 | 0.05 |
| 0.10 | 0.98 | 0.11 | 0.11 |
| 0.15 | 0.96 | 0.17 | 0.18 |
| 0.20 | 0.94 | 0.23 | 0.25 |
| 0.25 | 0.90 | 0.30 | 0.33 |
| 0.30 | 0.86 | 0.37 | 0.43 |
| 0.35 | 0.81 | 0.44 | 0.54 |
| 0.40 | 0.76 | 0.50 | 0.67 |
| 0.45 | 0.70 | 0.57 | 0.82 |
| 0.50 | 0.64 | 0.64 | 1.00 |

The phase selector 70 is a table look-up for the phase rotation angle ($\phi_K$). The outputs of the phase selector 70 are cos $\phi_K$, sin $\phi_K$ and $f_K(m)$. The phase selector 70 requires 128 or 64K words by 8-bit ROMS to look-up $\phi_K$ followed by two 256 word by 8-bit ROMs, one for cos $\phi_K$ and one for sin $\phi_K$. The main cell M is delayed by delay registers 130, 144 to account for the propagation delay through the peak cell selector 66 and phase selector 70 to align $\phi_K$ with the main cell M. The phase rotator 68 is a complex multiplier $Re^{j\phi_K}$ where R is the in-phase and quadrature-phase output of delay registers 130, 134 of FIG. 7, ($R=I_M+jQ_M$ and $e^{j\phi_K}=\cos \phi_K+j\sin \phi_K$). This interpolation technique can also be used to estimate the interference frequency $\omega_K=2\pi f_K$. $\omega_K$=interference frequency in radians/second $f_K$=interference frequency in Hertz or cycles per second $f_K(m)$ is the fractional part of the distance in frequency (Hertz) between two FFT frequency bins or cells. When the cell number m is the peak cell, m+K is the interference frequency estimate. The frequency estimate in Hertz is (m+K)$F_S$/N.

Referring now to FIG. 11 and also FIGS. 4, 5 and 7, the filter controller 60 comprises a frequency coefficient output controller 102 and a scale factor discriminator for pulsed interference 104. The frequency coefficient output controller 102 provides the delay registers for the excision process of the interference excisor 42 to pass the forward FFT 82 output frequency coefficients scaled and rotated to the inverse FFT 90. The scale factor discriminator for pulsed interferences 100 generates a canceler enable 105 signal which disables the interference detector 18 output estimate $I_{EST}$ by disabling the D/A 48, 52 outputs (FIG. 4) for zero output when the interference blinks off. The output is also disabled when the scale factor canceler enable 148 (FIG. 14) indicates the interference level is below the Mode A threshold. The test enable AND Gate 152 allows testing the system with the canceler disabled, when the TESTENABLE signal is a logic zero.

The swept frequency interferences typically have a maximum rate of one MHz per second or one Hertz per microsecond. A typical swept frequency, sweeping from a lower frequency F1 to a final higher frequency F2 is:

$$I(t) = \sin 2\pi \left[ \frac{(f2 - f1)}{T} (t) + f1 \right] t$$

I(t) is the interference as a function of time t
T is the sweep duration low to higher frequency
f1 is the initial starting frequency after T seconds
f2 is the final end frequency after T seconds $$\phi_I = 2\pi \left[ \frac{(f2 - f1)}{T} t + f1 \right] t \text{ interference phase}$$

$$\frac{d\phi}{dt} = 4\pi \frac{(f2 - f1)}{T} t + 2\pi f1$$

The interference frequency is linear sweeping from a frequency f1 to f2 in T seconds. The interference phase for a linear sweep is a parabolic phase function. During the data collection $T_C$ the frequency cell charge over 256 samples, sampled at 20.46 MHz is 12.5 Hz for a 1 MHz/sec sweep rate. The phase angle $\phi_K$ change is only 0.225 degrees and is effectively linear over this small section of the phase parabola. The processing delay of $T_D=4TC$ or 50 microseconds is only 50 Hz and 0.9 degrees of phase. The interferences detector processing is fast enough that for all practical purposes the interference frequency can be considered constant for any block of N samples for IF cancellation.

Referring now to FIG. 12, a block diagram of the scale factor discriminator for pulse interferences 104 is shown which is part of the filter controller 60 of FIG. 11. The forward FFT 82 frequency domain scale-factor signal FSF(3-(0) indicates that the interference is present or has turned off. The FSF (3-(0) signal fed to a scale factor canceler enable 148 which tests for FSF (3-(0) being greater than Mode A; if FSF (3-(0) is greater than Mode A, then the Canceler Enable signal is set; if SF (3-(0) is not greater than Mode A, then Canceler Enable signal is cleared or not set. When the block floating point scale factor FSF (3-(0) is equal to or greater than the Mode A threshold the canceler enable 105 signal is logic zero to disable the interference detector 18 output, setting the interference detector 18 output equal to zero by clearing registers 73, 77.

A TESTENABLE signal at the input to AND gate 152 is a logic HIGH to enable the canceler enable 105 function. When the TESTENABLE is a logic LOW, the interference detector 18 is disabled for testing the main path in FIG. 2 with interference $I_{EST}$ equal to zero.

Figure 13:
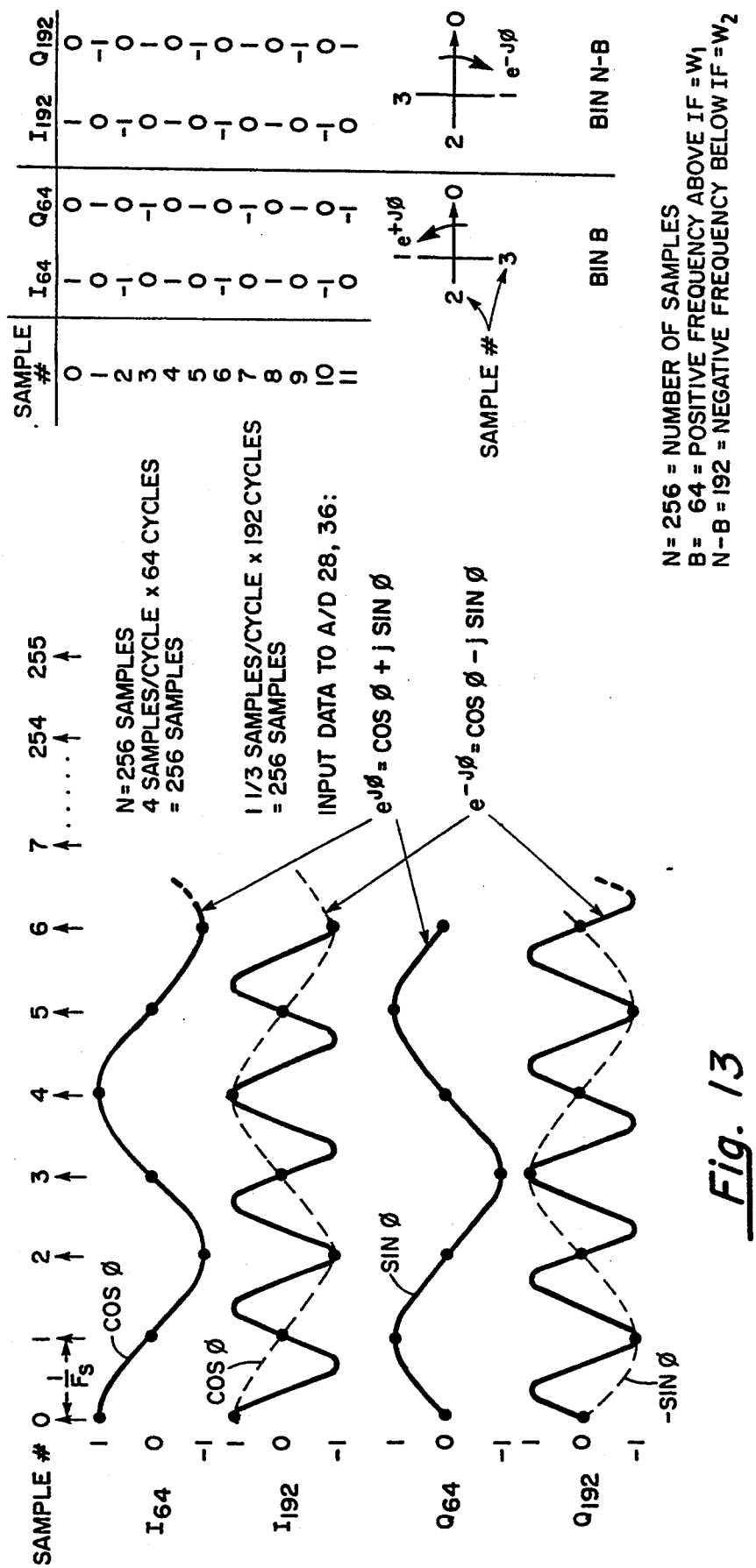
FIG. 13 shows interference signals above and below the IF signal sampled at baseband.
Figure 14:
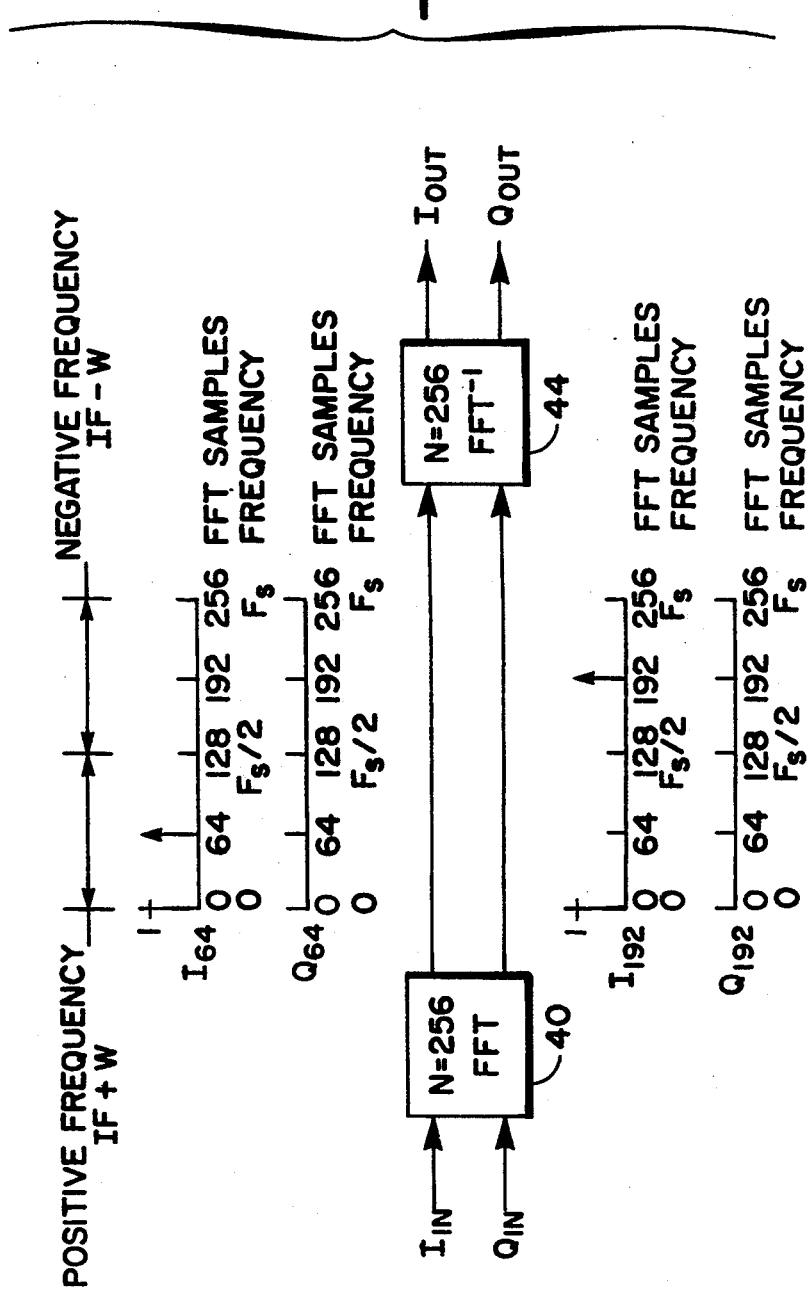
FIG. 14 shows baseband sampled interference signals $I_{IN}$ and $Q_{IN}$ being converted to the frequency domain by a 256 point forward FFT and then reconverted to the time domain by a 256 point inverse FFT to show the sampling frequency ($F_S$) required for interference canceling.

Referring now to FIG. 13 and FIG. 14, FIG. 13 shows interference signals above and below the IF signal frequencies sampled at baseband. FIG. 14 illustrates the baseband sampled interference signals $I_{IN}$ and $Q_{IN}$ being converted to the frequency domain by a 256 point forward FFT 40 and then reconverted to the time domain by a 256 point inverse FFT 44 to show the sampling frequency ($F_S$) required for interference canceling.

At IF it can be shown that the sampling frequency is equal to or greater than the $2F_o$ IF bandwidth in order to cancel interferences above and below the intermediate frequency ($17F_o$) by the interference canceler 20. At IF, the interference frequencies can be above or below the intermediate or IF frequency. The complex-algebra representation using Eulers formula is as follows:

For frequencies above the IF:

$$|F|e^{j(\omega_{IF}+\omega_1)t} = |F|e^{j\omega_{IF}t}e^{j\omega_1 t}$$

Down converting to baseband sets $\omega_{IF}$ equal to 0, leaving the interference equal to:

$$|F|e^{j\omega_1 t} = |F|e^{j\phi_1}$$

For frequencies below the IF:

$$|F|e^{j(\omega_{IF}-\omega_2)t} = |F|e^{j\omega_{IF}t}e^{-j\omega_2 t}$$

Down converting to baseband sets $\omega_{IF}$ equal to 0, leaving the interference equal to:

$$|F|e^{-j\omega_2 t} = |F|e^{-j\phi_2}$$

Further description of the complex-frequency representation of interference frequencies is provided in a text book on "Linear Circuits," by Ronald E Scott, Addison—Wesley Publishing company, Inc., Reading, Mass., 1960, pp. 516–522. On page 521 Scott shows amplitude modulation represented by counter rotating vectors or phasers which is analogous to the two interference frequencies equally spaced above and below the IF shown in FIG. 13. The first vector interference frequency $\omega_1$ rotates in the counter clockwise or positive frequency direction at an angular rate of $\omega_1$ radians per second. The second vector interference frequency $\omega_2$ rotates in the clockwise or negative frequency direction at an angular rate of $\omega_2$ radians per second. When the vector frequency magnitudes are equal ($|\omega_1|=|\omega_2|$), the imaginary components Q64 and Q192 shown in FIGS. 15 and 16 cancel each other, and the down converter 22 output is a purely real vector. The forward FFT 82 outputs, $I_{FIN}$ and $Q_{FIN}$ to the interference excisor 42 is shown in FIGS. 15 and 16 for a 256 point transform where:

N=256
B=64 ($\omega_1$ FFT Frequency Coefficient)
N−B=192 ($\omega_2$ FFT Frequency Coefficient)
$F_S \geq 2F_o$ (Sampling Frequency)
$\omega_S = 2\pi F_S \geq 2\pi(2F_o)$
$f_1 = (F_S/256) \times 64$ and $\omega_1 = 2\pi f_1$
$f_2 = -(F_S/256) \times 64$ and $\omega_2 = 2\pi f_2$ The preferred embodiment implementation of the interference suppress unit (12) for continuous inputs places restrictions on the $F_S$ sample clock and $F_T$ transform clock. The key parameters are as follows:

First, the thru-put requires only one FFT for the forward FFT and one FFT for the inverse FFT, i.e. the Plessy FFT chip set has maximum thru-put for the forward and inverse FFT equal to 816 transform clock cycles for a maximum $F_T$ equal to a 40 MHz clock where, $T_{FTT}=T_{FFT}^{-1}=816(1/40 \text{ MHz})=20.4$ microseconds ($\mu s$).

$$F_S \leq \frac{F_T \text{ (NUMBER OF } F_S \text{ CLOCKS)}}{\text{NUMBER OF } F_T \text{ CLOCKS}}$$

$$F_S \leq \frac{40 \text{ MHz } (256)}{816} \leq 12.549 \text{ MHz}$$

Second, sampling frequencies greater than 12.549 MHz will require multiple FFT's for the forward and inverse transform. An application with the sampler frequency equal to $2F_o$ or 20.46 MHz ($f_o$32 10.23 MHz) requires a data collection time for 256 samplers of $256 \times (1/20.46 \text{ MHz}) = 12.5$ µs. The FFT and inverse FFT transform clock is:

Transform Clock = 1/(12.5µs/816) = 65 MHz

FFT integrated circuits now available run at a 40 MHz clock rate. FFT integrated circuits to be developed in the future will be at least twice as fast.

Third, the advantage is to match the data collection time. The transform clock for 816 clock cycles per transform equals $(1/12.5 \text{ µs}/2 \times 816) = 130$ MHz. This will most likely not be realizable in the near term.

Fourth, it is possible to develop a custom application specific integrate circuit (ASIC). This custom ASIC will include the time to frequency converter 40, the interference excisor 42 and the frequency to time converter 44. The theoretical number of FFT clocks per transform for a radix 4 FFT is 256. Now with the transform clock equal to 40.92 MHz (approximately the present FFT transform clock) and the sample clocks at one-half this frequency, the equation for continuous inputs and outputs are:

$T_D = 4 \ T_C$ = Processing Delay $$F_S \leq \frac{40.92 \times 256 \times 2}{512 \times 2} = 20.46 \text{ MHz}$$

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. A radio receiver comprising:
    means for generating an IF signal from a received spread spectrum signal including interference signals;
    means coupled to said IF signal generating means for suppressing said interference signals coupled to said IF signal;
    said suppressing means comprises means for down converting said IF signal including interference signals to baseband sampled signals;
    means coupled to said down converting means for converting said baseband sampled signals from a time domain to a frequency domain;
    means coupled to said time domain to frequency domain converting means for excising said interference signals in said frequency domain;
    said excising means comprises a filter controller means coupled to said time domain to frequency domain converting means for generating delays for said frequency domain interference sampled signals to allow for continuous inputs and outputs of said suppressing means;
    a cell magnitude detector means coupled to said delayed interference sampled signals from said filter controller means for detecting an adjacent and main cell magnitude of said interference sampled signals at a sampling frequency rate;
    phase selector means coupled to said cell magnitude detector means for determining a phase rotation angle ($\phi_K$) of each of said frequency domain interference sampled signals;
    phase rotator means coupled to said phase selector means and said filter controller means for providing said phase rotation angle ($\phi_K$) to each of said frequency domain interference sampled signals;
    a frequency domain amplitude selector means coupled to said phase rotator means for denormalizing said phase rotated frequency domain interference sampled signals to generate frequency domain interference amplitude estimates in accordance with a frequency domain scale factor signal;
    means coupled to said excising means for converting said excised interference signals from said frequency domain to said time domain;
    means coupled to said frequency to time domain converting means for up-converting said interference signals from baseband sampled signals to intermediate frequency;
    means coupled to said up-converting means and said means for generating an IF signal for summing said interference signals from said up-converting means with said IF signal including interference signals from said means for generating an IF signal to cancel out said interference signals coupled to said IF signal;
    means coupled to said suppressing means for generating in-phase (I) and quadrature-phase (Q) samples of said IF output; and
    means coupled to said I and Q samples generating means for processing said I and Q samples.

2. The radio receiver as recited in claim 1 wherein said interference signal suppressing means comprises means for discarding said IF signal including noise.

3. The radio receiver as recited in claim 1 wherein:
    said interference signal suppressing means provides at least 25 dB of interference signal rejection.

4. The radio receiver as recited in claim 1 wherein said scale factor signal is produced by said time to frequency converter means and provides an estimate of the maximum received interference signals.

5. The radio receiver as recited in claim 1 wherein:
    said means for generating in-phase and quadrature-phase samples comprises signal processor means for removing a doppler frequency and PN-code modulation from said IF signal.

6. The radio receiver as recited in claim 5 wherein:
    said signal processor means comprises automatic gain control (AGC) means for holding the power approximately constant at the output of said I and Q samples generating means.

7. The radio receiver as recited in claim 6 wherein:
    said AGC provides an estimate of interference cancellation.

8. An interference suppressor comprising:
    means coupled to an IF signal which comprises interference signals for suppressing said interference signals, said suppressing means comprises means for down converting said IF signal including interference signals to baseband sampled signals;

means coupled to said down converting means for converting said baseband sampled signals from a time domain to a frequency domain;

means coupled to said time domain to frequency domain converting means for excising said interference signals in said frequency domain;

said excising means comprises a filter controller means coupled to said time domain to frequency domain converting means for generating delays for said frequency domain interference sampled signals to allow for continuous inputs and outputs of said suppressing means;

a cell magnitude detector means coupled to said delayed interference sampled signals from said filter controller means for detecting an adjacent and main cell magnitude of said interference sampled signals at a sampling frequency rate;

phase selector means coupled to said cell magnitude detector means for determining a phase rotation angle ($\phi_K$) of each of said frequency domain interference sampled signals;

phase rotator means coupled to said phase selector means and said filter controller means for providing said phase rotation angle ($\phi_K$) to each of said frequency domain interference sampled signals; and a frequency domain amplitude selector means coupled to said phase rotator means for denormalizing said phase rotated frequency domain interference sampled signals to generate frequency domain interference amplitude estimates in accordance with a frequency domain scale factor signal;

means coupled to said excising means for converting said excised interference signals from said frequency domain to said time domain;

means coupled to said frequency to time domain converting means for up converting said excised interference signals from baseband sampled signals to intermediate frequency; and means for combining said interference signals with said IF signal which comprises interference signals to cancel said interference signals.

9. A method of suppressing interference signals comprising the steps of:

estimating said interference signals in a frequency domain by down converting IF signals including interference signals to baseband sampled signals;

converting said baseband sampled signals from a time domain to a frequency domain;

generating delays for said frequency domain interference sampled signals to allow for continuous inputs and outputs of said suppressing means with a filter controller means coupled to said time domain to frequency domain converting means;

detecting an adjacent and main cell magnitude of said interference sampled signals at a sampling frequency rate with a cell magnitude detector means coupled to said delayed interference sampled signals from said filter controller means;

determining a phase rotation angle ($\phi_K$) of each of said frequency domain interference sampled signals using a phase selector means coupled to said cell magnitude detector means;

providing said phase rotation angle ($\phi_K$) to each of said frequency domain interference sampled signals using a phase rotator means coupled to said phase selector means and said filter controller means;

denormalizing said phase rotated frequency domain interference sampled signals to generate frequency domain interference amplitude estimates in accordance with a frequency domain scale factor signal using a frequency domain amplitude selector means coupled to said phase rotator means;

converting said estimated interference signals from said frequency domain to said time domain;

up converting said estimated interference signals from baseband sampled signals to intermediate frequency; and combining said estimated interference signals with said IF signals which comprise interference signals to cancel said interference signals.

* * * * *